US009900511B2

(12) United States Patent
Bell et al.

(10) Patent No.: US 9,900,511 B2
(45) Date of Patent: Feb. 20, 2018

(54) METHOD, SYSTEM, AND DEVICE FOR CONTROLLING A STABILIZED CAMERA REMOTELY

(71) Applicant: Freefly Systems, Inc., Woodinville, WA (US)

(72) Inventors: Hugh Bell, Bellevue, WA (US); Tabb Firchau, Redmond, WA (US); Shane Colton, Redmond, WA (US); David Bloomfield, Redmond, WA (US); John Ellison, Ipswich (GB); Steve Webb, Chelmsford (GB)

(73) Assignee: Freefly Systems, Inc., Woodinville, WA (US)

( * ) Notice: Subject to any disclaimer, the term of this patent is extended or adjusted under 35 U.S.C. 154(b) by 0 days.

(21) Appl. No.: 15/095,747

(22) Filed: Apr. 11, 2016

(65) Prior Publication Data

US 2016/0301845 A1   Oct. 13, 2016

Related U.S. Application Data

(60) Provisional application No. 62/145,920, filed on Apr. 10, 2015.

(51) Int. Cl.
*H04N 5/232* (2006.01)
*H04N 5/225* (2006.01)
(Continued)

(52) U.S. Cl.
CPC .......... *H04N 5/2328* (2013.01); *G01C 21/18* (2013.01); *G03B 17/561* (2013.01);
(Continued)

(58) Field of Classification Search
CPC ............ H04N 5/2328; H04N 5/23203; H04N 5/2252; H04N 5/23206
See application file for complete search history.

(56) References Cited

U.S. PATENT DOCUMENTS 3,638,502 A   2/1972   Leavitt et al.
4,033,541 A   7/1977   Malueg
(Continued)

FOREIGN PATENT DOCUMENTS

DE   102008003680 A1   1/2009
DE   102012203834 B3   6/2013
(Continued)

OTHER PUBLICATIONS

"International Search Report and Written Opinion for PCT Application No. PCT/EP2014/055218", dated Jun. 10, 2014, Filed Date: Mar. 14, 2014.
(Continued)

*Primary Examiner* — Padma Haliyur
(74) *Attorney, Agent, or Firm* — Talem IP Law, LLP

(57) ABSTRACT

A remote control device, method, and system for controlling a stabilized camera remotely are disclosed. The remote control device includes a steering member rotatable around a pan axis, a tilt axis, and/or a roll axis of the remote control device, an inertial measurement unit (IMU) mounted on the steering member and configured to measure a pointing direction of the steering member in relation to the pan axis, the tilt axis, and/or the roll axis, a controller configured to derive a pointing direction update based on the measurements obtained by the IMU, and a transmitter configured to transmit, to a stabilization system configured to stabilize the camera in accordance with a commanded pointing direction, the derived pointing direction update as the commanded pointing direction to effectuate adjustment of a pointing direction of the camera to follow a rotational movement of the steering member.

19 Claims, 7 Drawing Sheets

(51) Int. Cl.
*G01C 21/18* (2006.01)
*G03B 17/56* (2006.01)

(52) U.S. Cl.
CPC ....... *H04N 5/2252* (2013.01); *H04N 5/23203* (2013.01); *H04N 5/23206* (2013.01)

(56) References Cited

U.S. PATENT DOCUMENTS

| | | | |
|---|---|---|---|
| 4,752,791 A | 6/1988 | Allred | |
| 4,989,466 A | 2/1991 | Goodman | |
| 5,179,421 A | 1/1993 | Parker et al. | |
| 5,457,370 A | 10/1995 | Edwards | |
| 5,897,223 A | 4/1999 | Tritchew et al. | |
| 5,967,458 A | 10/1999 | Williams et al. | |
| 6,222,546 B1 | 4/2001 | Yokoyama et al. | |
| 6,268,863 B1 | 7/2001 | Rioux | |
| 6,611,662 B1 | 8/2003 | Grober | |
| 6,867,799 B2 | 3/2005 | Broemmelsiek | |
| 6,965,397 B1 | 11/2005 | Honey et al. | |
| 6,999,005 B2 | 2/2006 | Okada et al. | |
| 8,346,070 B2 | 1/2013 | Beasley | |
| 8,350,916 B2 | 1/2013 | Ohmiya et al. | |
| 8,351,772 B2 | 1/2013 | Wakamatsu | |
| 2003/0024333 A1 | 2/2003 | Wyse | |
| 2004/0173726 A1 | 9/2004 | Mercadal et al. | |
| 2005/0052531 A1 | 3/2005 | Kozlov et al. | |
| 2005/0206726 A1 | 9/2005 | Yoshida et al. | |
| 2006/0025959 A1 | 2/2006 | Gomez et al. | |
| 2006/0092508 A1 | 5/2006 | Baun et al. | |
| 2008/0034954 A1 | 2/2008 | Grober | |
| 2009/0257741 A1 | 10/2009 | Greb et al. | |
| 2010/0079101 A1 | 4/2010 | Sidman | |
| 2010/0110192 A1 | 5/2010 | Johnston et al. | |
| 2011/0042459 A1 | 2/2011 | Sullivan et al. | |
| 2011/0206124 A1 | 8/2011 | Morphet et al. | |
| 2011/0221900 A1 | 9/2011 | Reich | |
| 2012/0099851 A1 | 4/2012 | Brown | |
| 2012/0120258 A1 | 5/2012 | Boutell et al. | |
| 2012/0200722 A1 | 8/2012 | Kozlov et al. | |
| 2012/0316685 A1 | 12/2012 | Pettersson | |
| 2013/0162852 A1 | 6/2013 | Boyle et al. | |
| 2014/0008496 A1* | 1/2014 | Ye | B64C 13/20 244/190 |
| 2014/0270743 A1* | 9/2014 | Webb | H04N 5/2328 396/55 |
| 2014/0288694 A1* | 9/2014 | Wagner | F16M 11/18 700/213 |

FOREIGN PATENT DOCUMENTS

| | | |
|---|---|---|
| GB | 2036998 A | 7/1980 |
| GB | 2089522 A | 6/1982 |
| GB | 2375385 A | 11/2011 |
| JP | 2006060459 A2 | 3/2006 |
| JP | 2007183356 A2 | 7/2007 |
| JP | 2007271392 A2 | 10/2007 |
| JP | 2010026271 A2 | 2/2010 |
| WO | 2005024507 A2 | 3/2005 |
| WO | 2006097102 A1 | 9/2006 |
| WO | 2012164296 A1 | 12/2012 |
| WO | 2013098288 A1 | 7/2013 |
| WO | 2013181669 A1 | 12/2013 |

OTHER PUBLICATIONS

"International Search Report and Written Opinion for PCT Application No. PCT/EO2014/055219", dated Jun. 10, 2014, Filed Date: Mar. 14, 2014.

"International Search Report and Written Opinion for PCT Application No. PCT/EO2014/055220", dated Jun. 10, 2014, Filed Date: Mar. 14, 2014.

International Search Report and Written Opinion, issued in International Patent Application No. PCT/EP2014/055221, dated Jun. 13, 2014 (11 pages).

* cited by examiner

METHOD, SYSTEM, AND DEVICE FOR CONTROLLING A STABILIZED CAMERA REMOTELY

FIELD OF THE TECHNOLOGY

The present disclosure relates to stabilization systems, and more particularly to devices for controlling remotely a lightweight, hand-held or vehicle-mounted camera, stabilized for use in photographic or video-related applications.

BACKGROUND

Stabilization systems, such as an actively stabilized camera gimbal, often require a remote operator to control the pan, tilt, and/or slew rates of the camera. Therefore, control of a handheld gimbal requires two operators, who translate and point the gimbal simultaneously. One of the operators carries the gimbal, e.g., the camera operator, while the other operator, e.g., the remote operator, controls the pointing angle of the camera.

Typically, the remote control of the stabilized camera has been effected through use of a joystick and a monitor. However, to achieve the level of precision and control acceptable in film production and to be able control the camera gimbal and the camera, effectively, the remote operator needs to exercise a particular skill and adeptness, which may only be acquired through substantial practice and training. Also, the joystick sensitivity requires calibration for fast or slow slew rates to ensure smooth control of the camera by the remote operator during slow and fast movements of the camera operator, and is dependent on the type of desired effect and/or scene. The remote operator may easily cause unintentional jitter of the joystick, which results in deterioration in the quality of the captured footage, sometime imparting significant deterioration. Additionally, known remote control devices for controlling camera gimbals often produce a 'discontinuous steps' effect when commanding a change in the pointing angle of the camera, for example via some resolution limits on a joystick sensor.

Thus, it is desirable to provide a system, device, and method to improve the level of control and flexibility of the remote control device available to the remote operator and enable the remote operator to easily and intuitively control the camera gimbal and to capture the footage required. It is further desirable to reduce pointing jitter caused by remote controlling of the camera gimbal.

SUMMARY

The described embodiments of the invention provide for a method, a system, and a remote control device for enabling remote steering of a pointing angle of a camera, stabilized by a stabilization system, such as a gimbal. The remote control is enabled in respect of one or more rotational axes of the camera, such as pan, tilt, and roll. Such control is exercised responsive to rotational movements of a steering member of the remote control device, such as a handle(s) that are being moved by a remote operator. The remote operator is enabled to control the pointing angle of the camera using the steering member of the remote control device, which he or she holds as if he or she were holding the gimbal itself, controlling the gimbal directly using the steering member(s) of the gimbal. Further, a video feedback is provided to the remote operator to facilitation control of the remote control device.

Advantageously, the remote operator using the disclosed remote control device can achieve a higher quality footage than with known remote control systems, even when she or he has a lower skill. Furthermore, the described remote control device enables the remote operator to perform fast and slow motions with a high degree of accuracy and little motion tremor, and no calibration is required. The remote control enabled in accordance with the described principles and techniques is intuitive and precise.

In some embodiments, a method of adjusting a pointing angle of a camera, using a remote control device comprising a steering member is provided. The camera is housed by a stabilization system configured to stabilize the camera in accordance with a commanded pointing direction. The method comprises deriving a first measurement indicative of a pointing direction of the steering member in relation to a rotational movement of the steering member about one or more of a pan axis, tilt axis, and/or roll axis, and transmitting the derived measurement to the stabilization system as the commanded pointing direction to effectuate adjustment of the pointing angle of the camera to follow the rotational movement of the steering member. The steering member is rotatable around one or more of a pan axis, tilt axis, and/or roll axis.

In some example embodiments, the method further comprises subjecting the measurement provided to the stabilization system to fractional updates.

In some example embodiments, the method further comprises deriving a second measurement indicative of the pointing direction of the steering member in relation to the rotational movement, and transmitting the second measurement to the stabilization system as the commanded pointing direction to effectuate adjustment of the pointing angle of the camera to follow the rotational movement of the steering member if the second measurement differs from first measurement.

In some example embodiments, the method further comprises determining, for the stabilization system, a series of fractional updates to the commanded pointing direction based on the received first measurement; and adjusting, by the stabilization system, the pointing angle of the camera in accordance with each of the series of fractional updates of the commanded pointing direction applied sequentially until the second measurement is received, to cause the camera to follow the rotational movement of the steering member.

In some example embodiments, the series of fractional updates is determined depended on frequency with which measurements indicative of the pointing direction of the steering member are received by the stabilization system and frequency with which control updates are performed at the stabilization system.

In some example embodiments, the method further comprises preventing the camera from following the rotational movement of the steering member about one or more of the pan axis, the tilt axis, and/or the roll axis while a designated switch of the remote control device is engaged.

In some example embodiments, preventing the camera from following the rotational movement of the steering member comprises setting to zero an angular rate supplied to an integrator of the remote control device.

In some example embodiments, the method further comprises receiving a video being captured by the stabilization system, and displaying the video on a display device of the remote control device.

In some example embodiments, the video is captured by one or more of the camera or a co-located second camera having correlated fields of view.

In some example embodiments, the measurement of the pointing angle is derived using an inertial measurement unit co-located with the steering member.

In some example embodiments, the method is performed for one of the pan axis, the tilt axis, and/or the roll axis, and the commanded pointing angle for the camera for another one of the pan axis, the tilt axis, and/or the roll axis is determined based on measurements indicative of a pointing direction of a steering member of the stabilization system and derived in relation to a rotational movement of the steering member of the stabilization system about the other axis.

In some example embodiments, the commanded pointing direction is one of a commanded pointing angle or a commanded angular rate.

In some example embodiments, a computer-readable medium storing program instructions for causing a processor to perform any of the above-described methods.

In some example embodiments, a remote control device for remotely adjusting a pointing angle of a camera housed by a stabilization system and configured to stabilize the camera in accordance with commanded pointing direction is provided. The remote control device comprises a steering member rotatable around one or more of a pan axis, a tilt axis, and/or a roll axis of the remote control device; an inertial measurement unit (IMU) mounted on the steering member and configured to measure the pointing direction of the steering member in relation to one or more of the pan axis, the tilt axis, and/or the roll axis; a controller configured to derive a pointing direction update based on measurements obtained by the IMU; and a transmitter configured to transmit the derived pointing direction update as commanded pointing direction to the stabilization system to effectuate adjustment of a pointing direction of the camera to follow the rotational movement of the steering member.

In some example embodiments, the remote control device further comprises a switch engagement of which causes the camera to stop following the rotational movement of the steering member about one or more of the pan axis, the tilt axis, and/or the roll axis.

In some example embodiments, an angular rate supplied to an integrator of the remote control device is set to zero for duration of the switch engagement.

In some example embodiments, the steering member remains rotatable around one or more of the pan axis, the tilt axis, and/or the roll axis of the remote control device while the switch is engaged.

In some example embodiments, the remote control device further comprises: a receiver configured to receive a video signal from the stabilization system; and a display device configured to display the received video signal to provide video feedback of pointing control of the camera.

In some example embodiments, the received video is being captured by one or more of the camera or a co-located second camera having correlated fields of view.

BRIEF DESCRIPTION OF DRAWINGS

Examples of the present proposed approach will now be described in detail with reference to the accompanying drawings, in which.

DETAILED DESCRIPTION

Figure 1:
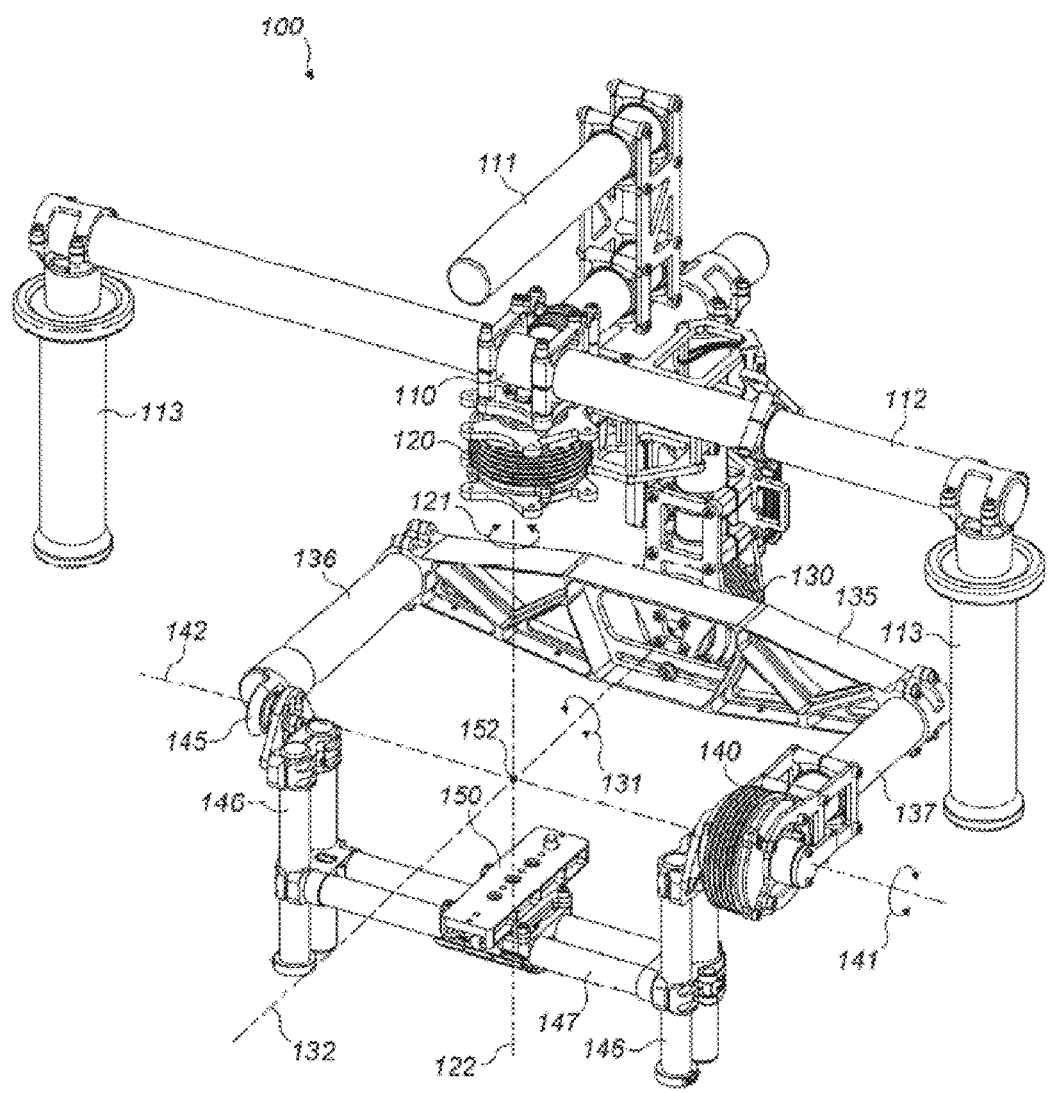
FIG. 1 shows a perspective view of a 3-axis stabilization system or gimbal suitable for being controlled using a remote control device, in accordance with some embodiments.

FIG. 1 shows an example of 3-axis camera stabilization system 100, also referred to as a gimbal, suitable for being controlled using a remote control device, in accordance with some embodiments. The system 100 includes a support base 110 to which a support frame 112 is attached for manual support and manipulation by an operator. Two handles 113 are attached to the support frame 112 on either side of the support base 110 to allow for two-handed operation of the gimbal 100 and full control over movement of the gimbal 100. A secondary frame 111 is attached to the support base 110 and may be used to attach the overall system 100 to a vehicle or other support or mount. The secondary frame 111 may also be used as a handle for single-handed operation by the operator. Further, peripheral devices may be attached to the secondary frame 111.

The illustrated system 100 is equipped with three motors, a pan axis motor 120, a tilt axis motor 140 and a roll axis motor 130. These motors can provide a rotational input in either direction around the pan 122, tilt 142, and roll 132 axes of the assembly as shown by arrows 121, 131, and 141, respectively. The three motors 120, 130, and 140, when working together, allow a full range of movement of a payload within the gimbal 100. In particular, the pan axis motor 120 is fixed (attached, or otherwise permanently secured, or is removable) to the support base 110 and configured (constructed, designed, or the like) to rotate a structure housing the roll axis motor 130. The roll axis motor 130 is in turn configured to rotate a structure housing the tilt axis motor 140, which is configured to rotate a payload (not shown).

In the illustrated system 100, the roll axis motor 130 rotates a roll beam 135, to which horizontal members 136 and 137 are attached. The tilt axis motor 140 is attached to one horizontal member 137, and its opposing pivot 145 is attached to the other horizontal member 136. The tilt axis motor 140 and the opposing pivot 145 rotate down-tubes 146 along with the cross member 147 attached to the down-tube 146, thereby rotating the payload attached to the cross member 147.

The payload will typically be a camera mounted to the system by a camera mounting arrangement 150. The camera mounting arrangement 150 is generally in the form of a plate, "shoe," or the like, which defines one or more protrusions for engaging with a corresponding recess on a mounting part of the camera. However, various coupling, engaging, and/or fixing means may be provided for securing the camera to the mounting arrangement 150, including but not limited to screw threads, clips, slide and lock mechanisms, and/or the like (not shown).

A point of intersection 152 of the three orthogonal axes 122, 132, and 142 preferably remains generally fixed regardless of the rotation of any of the three motors 120, 130, and 140. In order for a camera mounted in the stabilization system 100 to achieve "passive stability", the center of gravity (COG) of the camera, which varies for different camera designs, should be located at or as near as possible to point 152 where the three orthogonal axes 122, 132, and 142 intersect.

By positioning the camera COG at the intersection point 152, rotational moments applied to the camera by lateral acceleration disturbances of the system are reduced, or even eliminated. Furthermore, the inertia of the payload itself tends to cause the payload to maintain a pointing direction, notwithstanding frictional forces at the axes of rotation. By incorporating these or some other forms of passive stabilization into the arrangement of the system 100, the power draw of active stabilization is kept minimal, particularly when not in motion.

Adjustment means are provided within the stabilization system 100 in order to adjust the COG of a camera mounted to the mounting arrangement 150. For example, in FIG. 1, the mounting arrangement 150 is configured to enable repositioning of a mounted camera relative to each of the orthogonal axes. Centering the COG of the camera, mounted to the mounting arrangement 150, relative to an axis will render the camera "balanced" with respect to that axis. In other words, the camera COG will be at a neutral point relative to that axis, preferably located on the axis, or on a horizontal or vertical plane of the axis. Centering the COG of the camera along each of the orthogonal axes will provide for a balanced camera.

FIG. 1 depicts only an example of a structure of a gimbal suitable for being controlled remotely in accordance with the principles and techniques described herein. Some other examples of suitable gimbals may be found in U.S. Pat. No. 8,938,161, in U.S. Pat. No. 8,934,023, in U.S. Pat. No. 8,908,090, and in U.S. Pat. No. 8,861,947, the disclosures of which are incorporated herein by reference in their entirety. The devices, methods, and systems described herein are however not limited to these examples and can be similarly used with most stabilization systems or gimbals, whether such systems/gimbals are handheld or mounted, such as on a vehicle.

Figure 2:
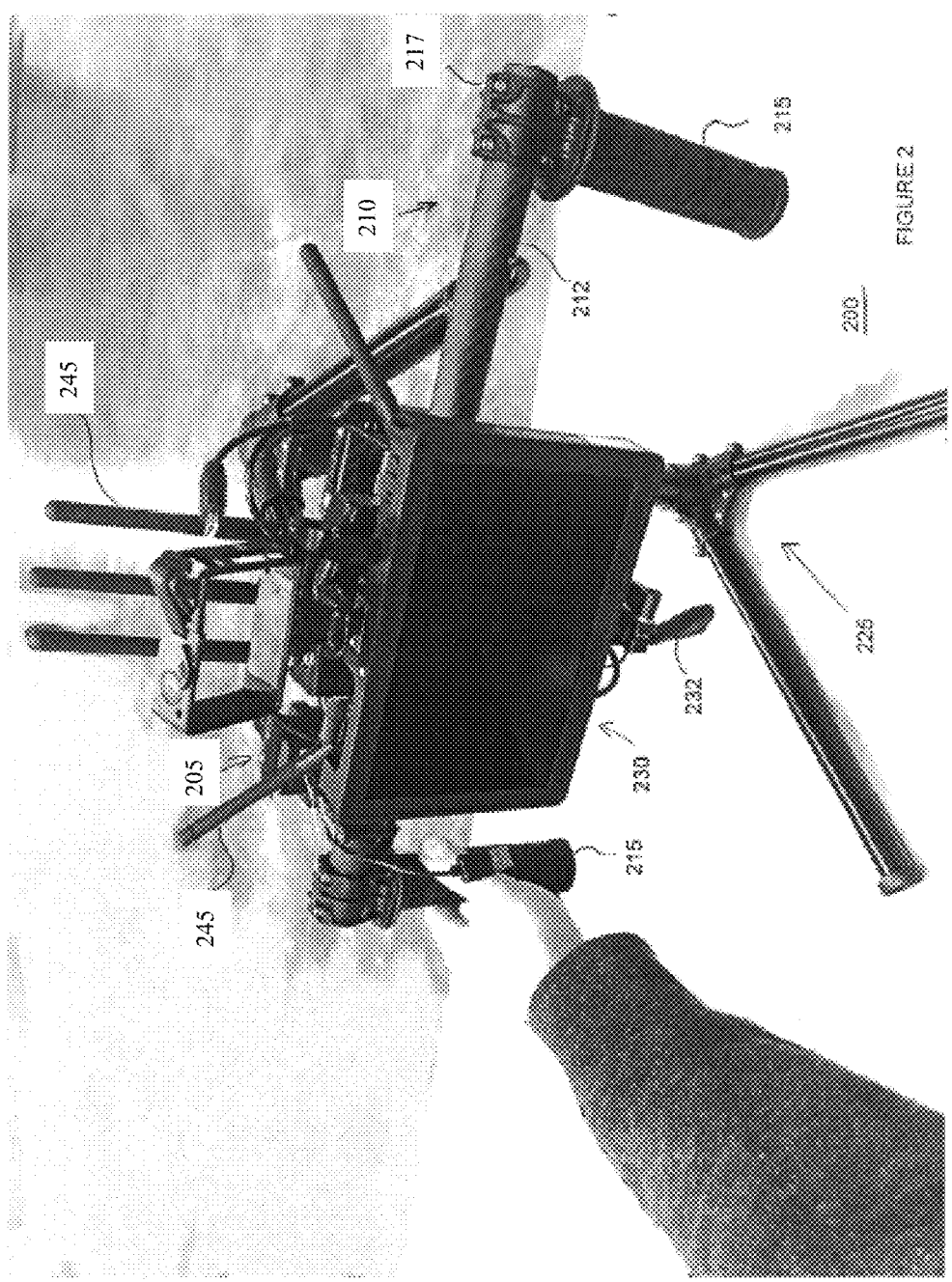
FIG. 2 shows a perspective view of a remote control device, in accordance with some embodiments.

FIG. 2 shows a perspective view of a remote control device 200, in accordance with some embodiments. The remote control device 200 enables remote steering of a pointing angle of a camera, stabilized by a stabilization system, such as a gimbal 100 described in respect of FIG. 1. The remote control device 200 enables its user to control the pointing angle of the camera in relation to one more rotational axes of the camera, such as pan, tilt, and roll. By rotating/maneuvering/steering a steering member 210 of the remote control device, a remote operator is able to steer the pointing angle of the camera. The steering member 210 includes a bar 212 and handles 215. In some embodiments, the handles 215 are removable. In some embodiments, the handles 215 are rotatably adjustable about the bar 212 and are fixed in a desired position using screws 217. However, various coupling, engaging, and/or fixing means may be provided for adjusting/securing the handles 215 about the bar 212, including but not limited to screw threads, clips, slide and lock mechanisms, and/or the like (not shown).

The handles 215 are balanced in relation to the center of the intended rotation of the steering member 210. In some embodiments, the mass of the handles 215 is intentionally heavier than might be perceived (the handles 215 are weighed down) to increase their physical rotational inertia. Heavier handles 215 aid the remote operator in achieving smoothness in the pointing control.

In some embodiments, the weight of the handles 215 is adjustable. For example, different sets of handles 215 having different weights can be supplied for use with the steering member 210 to allow the remote operator to choose the set that is most appropriate. In some embodiments, additional weights, attachable to/fixable on the handles 215, are supplied. Yet, in some embodiments, the handles 215 have a structure, and/or weight similar to those of the gimbal to induce in a remote operator a feeling of steering the gimbal, while actually steering the handles 215.

In FIG. 2, the remote control device 200 is depicted being placed on a support stand 225. However, in a more conventional mode of operation, the remote operator holds and controls the remote control device 200 using the handles 215 without the support stand 225, while carrying the remote control device 200.

The remote control device further includes an inertial measurement unit (IMU) 205 mounted onto or in proximity of the steering member 210 for detecting motion and movements of the steering member 210. In some embodiments, the IMU 205 is positioned near the center of the intended rotation of the steering member 210.

In a simplified model, the IMU 205 updates its attitude measurement at a pre-set rate. The attitude measurement can be, for example, represented using a Quaternion vector to remove singularity issues or pointing ambiguity. However, an Euler representation with pan, tilt, and/or roll angles may be used as well. When a measurement update is available from the IMU 205, a controller (not shown) of the remote control device 200 transmits the respective pointing vector or similar data to a respective controller of the gimbal, such as of the gimbal 100. The receiving gimbal controller translates the commanded pointing vector into a real pointing direction of the camera through pre-existing control loops. Such control loops are described in greater detail in relation to FIG. 4.

In some embodiments, the pointing vectors are transmitted to the gimbal controller via a packet data radio link. The remote control device 200 and the gimbal may include respective radio transceivers to facilitate transmission of data between the two. In some embodiments, a radio modem is integrated with the IMU 205.

The IMU 205 is able to measure attitude changes at rates of order 500 Hz. However, translation of the respective pointing vector representations to the gimbal, if performed using a conventional radio-modem link, will be limited due the characteristics of the radio-modem link. A 50 Hz frame rate can be used for the IMU measurement updates where the radio transmission bandwidth is acceptable and the control of the camera is sufficiently fast so as to be perceived as fluid and instantaneous. Radio modems operating normally in the 2.5 GHz, 868 MHz or 900 MHz band are suitable for such data transmissions and can coexist with other devices using frequency-hopping spread spectrum (FHSS) or some similar radio-transmission method together with an address ID.

Therefore, outputs of the gimbal's radio transceiver are vector representations of the remote pointing direction that command the camera operator's gimbal, and the pointing direction of the camera in particular. As previously mentioned, this representation may be in the form of a quaternion representation or alternatively an Euler pan, tilt, and/or roll angles. The gimbal controller inputs these commands into its internal control loops to effect adjustment of the pointing angle of the camera by comparing measurements of the gimbal IMU fixed to the camera with the instructions (measurements) of the remote IMU 205 sent by the remote control device 200.

The remote control device further includes a display device 230, which positioning may be adjusted in accordance with the remote operator's preferences. More specifically, in some embodiments, the angle of the display device 230 can be adjusted using an adjustable bracket 232. Further, in some embodiments, the display device 230 is slidably engaged with the bar 212, and thus can be adjusted, for example to balance the remote control device and/or to suit preferences of the remote operator.

The display 230 provides the remote operator with view from the camera, which is supplied to the display 230 from the camera gimbal via a wireless or wired link. For example, the display 230 and the gimbal can be linked via a radio link to enable cordless visualization, hardwired via copper or fiber-optic cable, and/or be connected in some other manner. Typically, the remote control device 200 and the gimbal include respective radio transceivers to facilitate transmission of data between the remote control device 200 and the gimbal, such as the gimbal 100. The remote control device 200 may further include video link diversity antennas 245 to facilitate support of the radio link. In some embodiments, the radio link has an ultra-high frequency (UHF) or microwave design to provide sufficient bandwidth such as required for a high definition video signal.

The display 230 provides effective feedback in respect of the pointing control by the remote operator, enabling the remote operator to effect complex and real time motions of the camera by simply observing images captured by the camera in real-time. Further, the decoupled nature of the remote operator and the camera operator allows the remote operator to focus on controlling the pointing angle of the camera, while the camera operator to focus on controlling the camera translation. Such control is particularly useful where the camera is being translated at high speed, making it more difficult for a single operator to perform pointing and framing actions simultaneously with translation of the camera.

The IMU 205 can be integrated with a radio modem, barometer, accelerometer, compass and/or GPS into a single unit. In some embodiments, the gimbal employs a similar IMU unit and higher order functions are enabled via a two-way data link between the remote control device and gimbal. For example, by knowing the geo locations of both the handles 215 and the remote gimbal, a relative heading can be inferred and referenced to a real compass heading. Based on its IMU readings and the location information provided from the gimbal IMU, the remote control device is able to determine whether the handles 215 are pointing in the same direction as the gimbal. This information may then be used to determine and add a moving offset to the commanded pointing direction of the camera in order to bias the remote operator to face towards the gimbal, while he or she is maintaining a framed image.

To guide/bias the remote operator towards adjusting the pointing direction of the handles 215 to correspond to the gimbal's pointing direction, a moving offset is applied to slowly alter the gimbal direction. A non-commanded gimbal motion will result, which the remote operator would tend to correct by performing an opposite handle motion to prevent the non-commanded change. Thus, effectively, this approach will steer the operator, for example, by means of the visual feedback on a display device discussed below, to a position of holding the handles 215 pointing in the direction of the remote gimbal. The time constant for achieving the described altering effect is set long so that the guidance steering is significantly slower than the real time pointing commands by the remote operator, for example by a factor of 1/10th of the speed. Accordingly, the remote control device 200 is enabled to automatically perform the function of the manual button intervention technique discussed below in respect of FIGS. 6 and 7.

In some embodiments, when a determination is made that the direction of the handles 215 does not correspond to the pointing direction of the gimbal, the user is provided with additional video feedback indicating that correction is required. Such a feedback may for example be effectuated as an overlay image on the video display on the display device 230. This additional feedback may be provided in addition to altering the commanded pointing direction, or instead.

In some embodiments, the radio transmission from the remote control device 200 to the gimbal, such as the gimbal 100, is nominally unidirectional. Therefore, the remote control device may employ a transmitter instead of the transceiver. Further, the number of listening devices does not need to be limited. Therefore, in some embodiments, a single remote control device 200 is configured to control a plurality of gimbals. Such a configuration may, for example, be suitable to achieve a different viewpoint or a stereovision effect.

In some embodiments, the return transmission from the gimbal to the remote control device over the radio link is employed to transport service information, such as a calibrated heading, a GPS location, a compass reading, or some other parameter. Also, in some embodiments, a computer-readable memory, such as and SD card, for recording motion and movement of the remote control device is provided within the device, for example, integrated with the IMU 205.

The remote control device 200 further includes a power source (not shown) to enable operation of the remote control device 200. In some embodiments, the power source is replaceable and/or rechargeable battery coupled with the remote control device 200 for example using USB. For example, a USB style 5V backup battery pack is suitable to supply required power.

Figure 3:
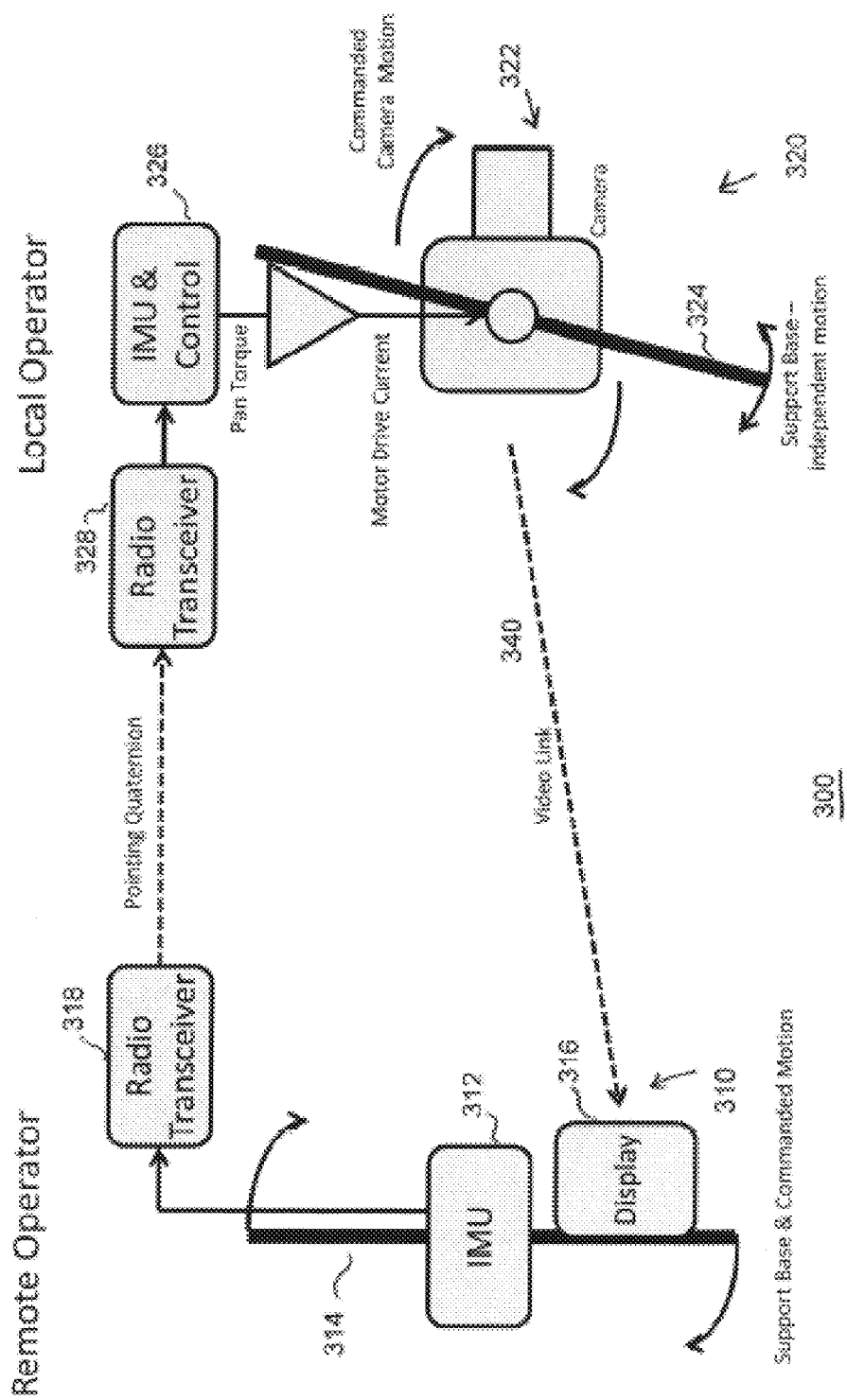
FIG. 3 shows an example of a system for controlling remotely a camera gimbal, in accordance with some embodiments.

FIG. 3 shows an example of a system 300 for controlling remotely a camera gimbal, in accordance with some embodiments. The system includes a remote control device 310, such as described above in respect of FIG. 2, and a gimbal 320, such as the gimbal 100 discussed in respect of FIG. 1, that are in communication via a radio link 330 and a video link 340. The remote control device 310 depicted in FIG. 3 includes a steering member 314, an IMU 312, and a display 316. At a higher level, the IMU 312 captures the motion and movement measurements in association with the rotational movements of the steering member 314. Such measurements are sent as commanding instructions (e.g., for example in the form of pointing quaternion) from a radio transceiver 318 (or a transmitter) of the remote control device 310 to a radio transceiver 328 (or a receiver) of the gimbal 320 via the radio link 330. A controller 326 uses such instructions in combination with the measurements of a local IMU to adjust the pointing angle of a camera 322 hosted by the gimbal 320.

In some embodiments, the gimbal controller 326 employs a nested PID control scheme to allow for a fast response to both angle and angular rate. The outer angle loop compares the actual angle of the camera 322 with the remote angle commanded by the remote control device 310 and determines a proportional error. The proportional error is then used to further command an inner proportional, integral, and differential error control loop that compares the actual and commanded angular rates of the camera.

Figure 4:
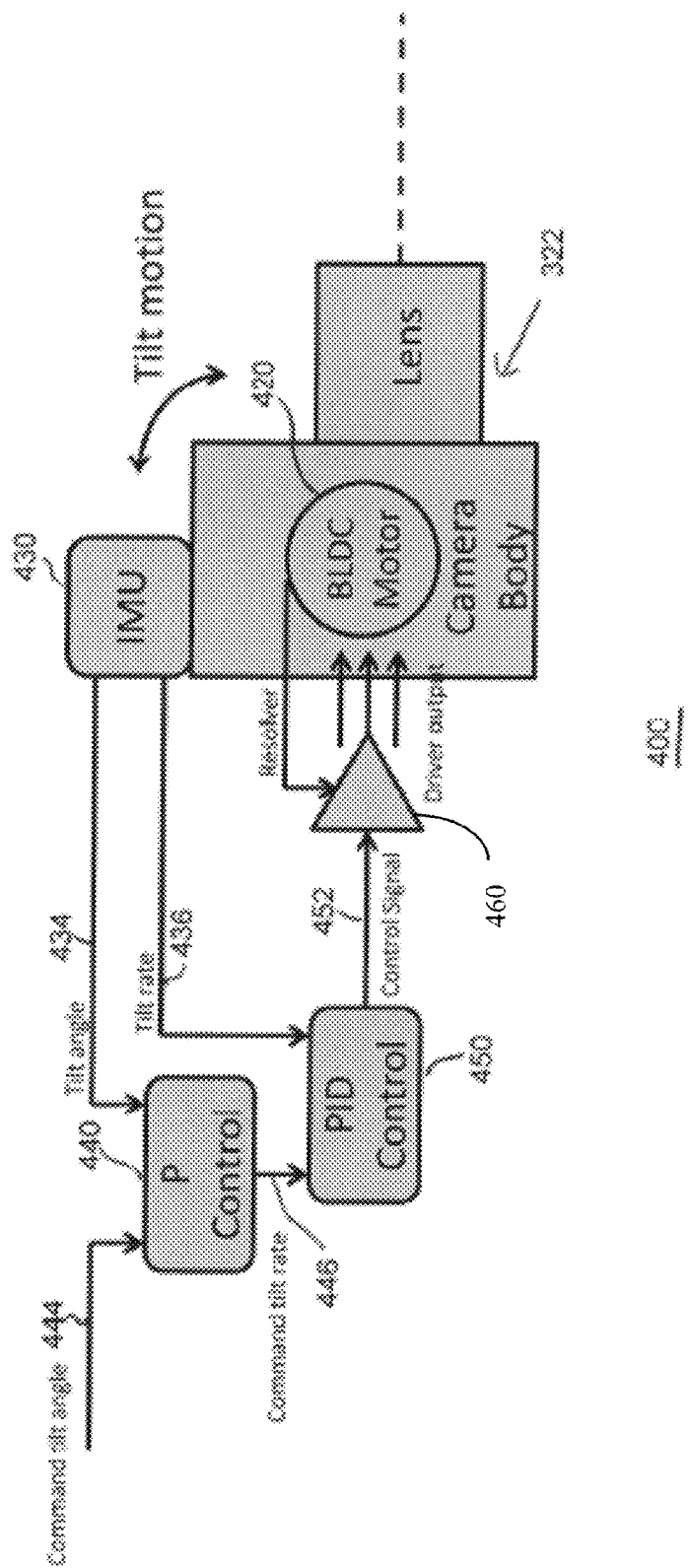
FIG. 4 shows a flowchart of a single axis controller for controlling a pointing angle of a camera in accordance with a commanded pointing angle, according to some embodiments.

FIG. 4 depicts a flowchart of an exemplary single axis controller 400 effecting a stabilization control process for controlling a pointing angle of a camera in accordance with some embodiments. The controller 400 controls the tilt angle of the camera 322 by controlling a brushless motor in accordance with adjustments determined based on the measurements obtained by the local (gimbal) IMU 430 and the commanded instructions issued by the remote control device 310 based on the measurements obtained by the remote IMU 312.

The stabilization control process employs a closed loop electro-mechanical feedback based on the proportional-integral-differential control technique. Both the tilt angle (attitude) and the tilt rate (motion, slew) of the camera are considered to determine the tilt angle update. The stabilization control process includes two nested loops, an outer loop for correcting angle errors and an inner loop for correcting control errors and stabilizing the tilt motion.

The outer, angle-based loop includes a P control element 440, which receives, as input, a tilt angle 434 of the camera 322, as detected by the IMU 430, and a command tilt angle 444 supplied by the remote control device 310 for the camera 322. The command tilt angle 444 generally reflects intentions of the remote camera operator at the time and is derived, as described herein, based on the measurements of the IMU 312 reflective of the steering motions of the steering member 314. The P control element 440 compares the command and measured tilt angles and sets a command tilt rate 446 for the motion that would result in the command tilt angle. In particular, P control element 440 senses an error between the command and measured tilt angles 444 and 434, amplifies the error by a proportional gain constant, and feeds the amplified error into the inner loop, thereby minimizing the angle error.

The inner, rate-based closed feedback loop includes a PID control element 450, which receives, as input, a tilt rate 436 of the camera 322, as detected by the IMU 430, and the command tilt rate 446, as set by the P control element 440. The PID control element 450 compares the two tilt rates to detect a control error, which it amplifies using proportional, integral, and differential constants to set a control signal 452 (such as a torque value) for controlling movement of a brushless DC motor 420 (or another actuator, such as a motor, a gearbox, a belt reduction drive, or the like). In particular, the output of the PID control element 450 is fed to the brushless DC motor 420 via a driver output element 460 to form an overall closed loop feedback circuit, thereby causing acceleration, deceleration (brake), or a reverse movement of the brushless DC motor 420. The driver output element 460 outputs 3-phase currents to the motor 420 and forms a local control loop together with an angle resolver 470 for controlling the 3-phase currents accurately and dependent on the motor phase angle. In some embodiments, the outputs of the driver output element 460 effectively control a torque generated by the motor 420 to accelerate/decelerate gimbal's tilt rotation.

Depending on a particular application and/or preferences, the stabilization control process of the controller 400 is replicated for some or all of the tilt, roll, and pan axes with the servo motors employed for the tilt, roll, and pan axes respectively. In response to the commands issued by the stabilization control processes for the respective axes, these motors operate to correct disturbances to the camera's pointing direction, automatically, such as to maintain a constant pointing angle (attitude) for each of the axes.

The output control signal 452 fluctuates when either of the steering member 314 of the remote control device 310 and the steering member 324 of the gimbal 320 is in motion, or there is a disparity between the local and remote pointing directions. The control signal 452 will ramp or rapidly increase in a respective direction to signal motion is required to reset the equilibrium.

The stabilization control process (that may be carried out by stabilization controller 400) can operate at a nominal frequency of 500 Hz to allow good disturbance rejection that may come about due to the gimbal's motion. This stabilization control process is substantially faster (at a higher frequency) than the commanded pointing updates provided by the remote control device which are limited for the reasons discussed in respect of FIG. 2.

Returning to FIG. 3, as shown, the camera operator has no influence on the camera's pointing direction, and simply carries the gimbal base to translate the camera location. A desired pointing direction is commanded from the remote operator who indicates the desired pointing direction by rotating the steering member 314 of the remote control device in the manner similar to as he or she were to rotate (steer) the steering member 324 of the gimbal 320.

The remote operator receives a video feedback concerning the commanded motions through a display 316 mounted on the steering member 314. The display 316 receives and display image data captured by the camera 322 through the video link 340. Such a video feedback enables the remote operator to frame the image and direct the pointing angle of the camera with precision.

In some embodiments, the gimbal includes a second camera, co-located with the main camera. The second camera has a wide lens (typically wider than that of the main camera) for providing the video feedback to the remote operator. The second camera is arranged such that its field of view generally correlates and encompasses the field of view of the first camera. This correlation/synchronization process can be performed when the system is powered up, or as required. It may include adjustments to both mechanical and control parameters/settings. A person skilled in the art would appreciate that the correlation/synchronization process will depend on technical characteristics of the cameras, such as type of lens, focus distance, and the like.

Typically, the second camera is smaller and lighter than the main camera and generates a video of a lower quality than the first camera. In this manner, the video feedback provided to the remote operator encompasses a greater field of view, helping the remote operator to predict or determine further movements and frame the image, and at the same time requires lower bandwidth for transmission of the video than the main camera. In some embodiments however both videos from the first and second cameras are provided to the remote control device and displayed on the display device simultaneously, for example, using a split screen, a window within a window, as an overlay, and the like. Furthermore, in some embodiments, overlay graphics are generated and displayed on the display device of the remote control device to indicate to the remote operator the actual field of view of the first camera in relation to the displayed video feedback.

The system 300 and controller 400 are depicted in FIGS. 3 and 4 respectively in the context of making adjustments to the pointing angle of the camera in relation to the tilt axis only. Similar controllers can be implemented to enable adjustments in relation to the other two axes, pan and roll. Further, control of the pointing angle of the camera 322 may be performed by different operators in relation to different axes. For example, the remote operator may control pan of the camera, while the local operator controls tilt of the camera, or vice versa. In other words, control in relation to selected one or more axes can be inhibited or activated in the remote control device 310 and/or the gimbal.

Figure 5:
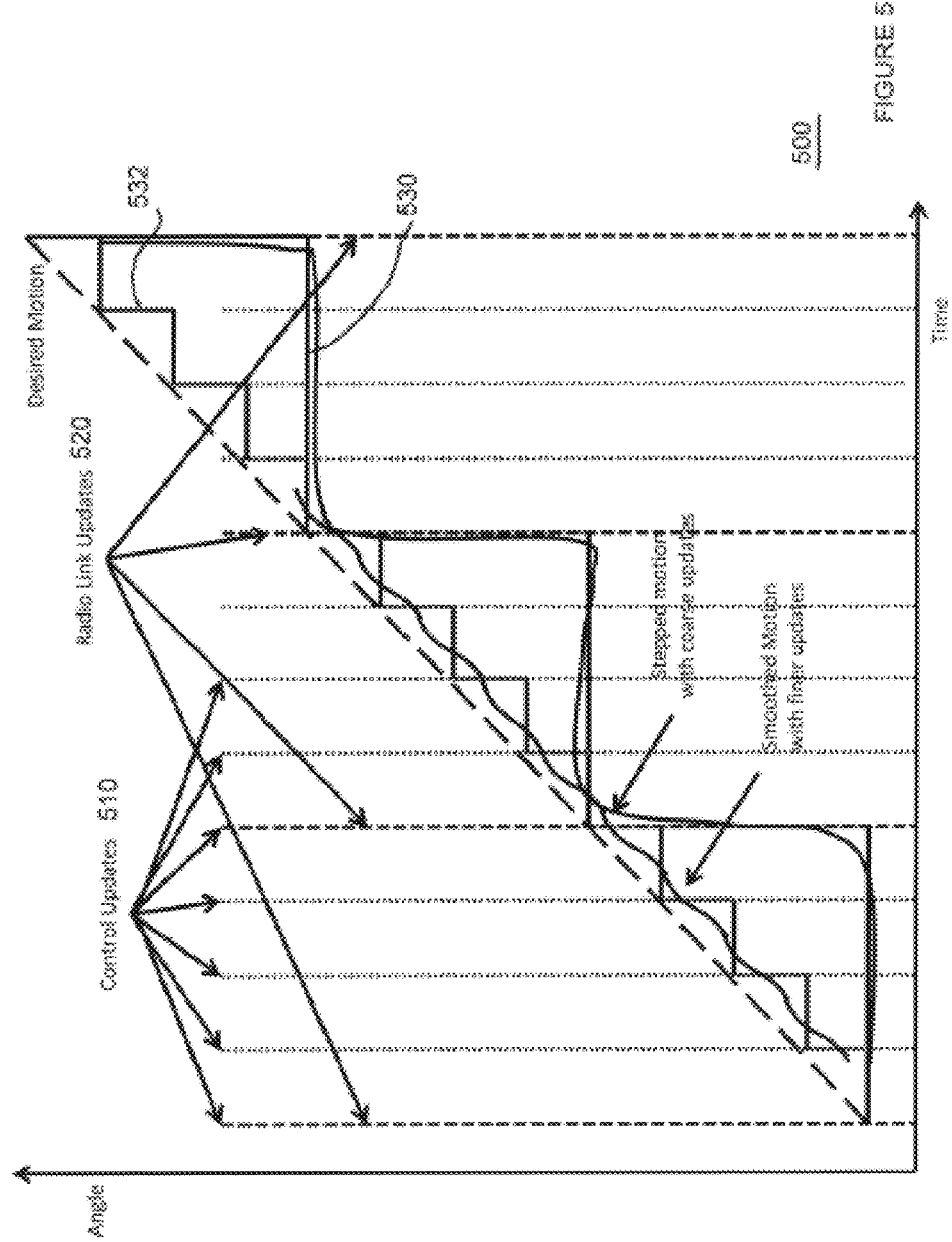
FIG. 5 shows a diagram of control and radio link updates in relation to a desired motion of the pointing angle, in accordance with an exemplary scenario.

In some embodiments, to enable smooth gimbal motion using remote pointing updates, the difference in frequency of radio updates and local control updates is taken into consideration and addressed. FIG. 5 depicts a diagram 500 of control and radio link updates in relation to a desired motion of the pointing angle, in accordance with an exemplary scenario.

In particular, FIG. 5 shows four control updates 510 per every remote radio update 520 as means for smoothing the desired response out. The remote control device effectively commands a pointing direction or an angle to the gimbal controller, for example in the manner described above in respect of FIGS. 2 and 3. As the steering member of the remote control device is in motion, a series of new pointing directions/angles at each radio update forming a staircase of discontinuities 530 will be issued by the remote control device. However, with the gimbal controller running at a higher rate (e.g., 200 Hz), the controller will supply a command angle change every 4 updates and have 3 updates with a constant angle. This will lead to a discontinuity of a large angle step on the 4th command, as shown by the staircase of discontinuities 530, resulting in a jerky gimbal motion.

In accordance with some embodiments, a method of fractional updates is applied to smooth this motion out. As the ratio between the radio update frequency and the control update frequency is known in advance, the update may be subdivided into smaller changes at each control interval. The desired motion will form a smaller pitch staircase 532. The actual motion of the camera's pointing angle follows this command even more closely, being smoothed by the mechanical time constants such as inertia. In some embodiments, the motion is subdivided further and is of a ratio of 500 Hz control signal to 50 Hz radio command leading, reducing the jerkiness of the camera motions significantly and making it unnoticeable. Without such fractional updates, the gimbal is often mechanically noisy, makes abrupt step changes, even though they may mostly be smoothed by inertia. In addition, large step changes are wasteful on power consumption and stress various components both mechanical and electronic.

Figure 6:
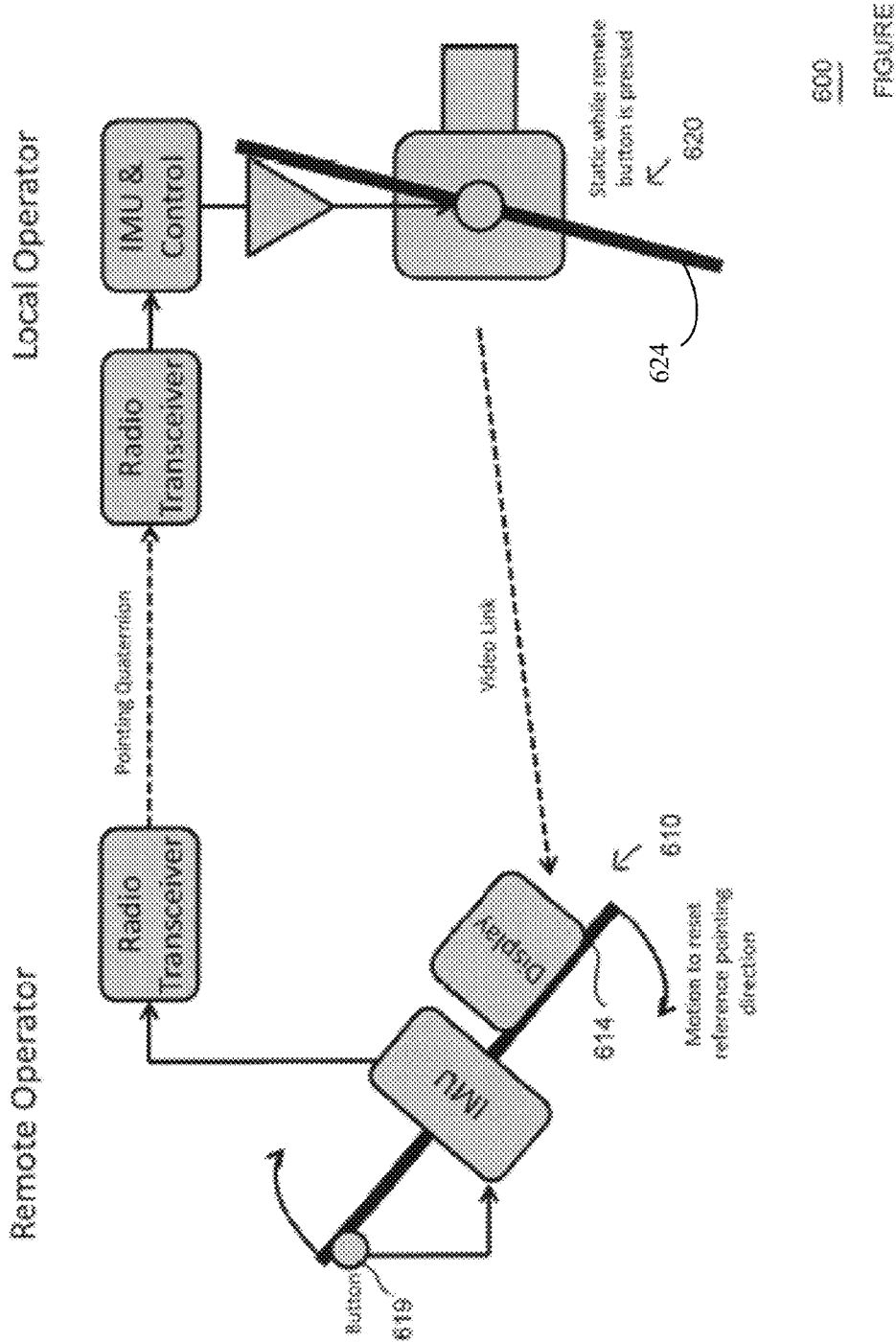
FIG. 6 shows another example of a system for controlling remotely a camera gimbal, in accordance with some embodiments.

FIG. 6 shows another example of a system 600 for controlling remotely a camera gimbal 620 using a remote control device 610, in accordance with some embodiments. It is often desirable for a steering member 614 of the remote control device 610 to point in the general direction of the gimbal location so as to allow the remote operator to maintain a visual queue of what the intended motion or action might be. As shown in FIG. 6, a button 619 can be provided on the remote control device 610 that controls the pointing updates of the remote control device 610. In particular, while the button 619 is engaged, the steering motion of the steering member 614 is allowed. However, updates for the pointing direction of the camera provided to the gimbal controller are adjusted so as to prevent the camera from following the rotational movements of the steering member about the pan, tilt and/or roll axes. In this manner, the remote operator may re-orientate him or herself, without causing undesirable motions in the gimbal 620. Once the remote operator regains the correct orientation, he or she disengages or releases the button to re-enable the pointing updates and their transmission to the gimbal 620.

In some embodiments, the steering member 614 of the remote control device 610 and the steering member 624 of the local gimbal 620 are referenced to each other via a synchronization step after the system 600 has been powered up. The synchronization can be performed in relation to tilt, pan, and/or roll, depending on the preferences of the operator(s), a desired effect, requirements of a scene and the like.

Further, the respective IMUs may comprise gyroscopes that are typically subject to non-identical drift or creep. Accordingly, in some embodiments, a calibrated compass is integrated in each of the IMUs to achieve a constant pointing without any long term drift or creep in either IMU. The button 619 may however still be used to alter the relative pointing of the remote control device 610.

Figure 7:
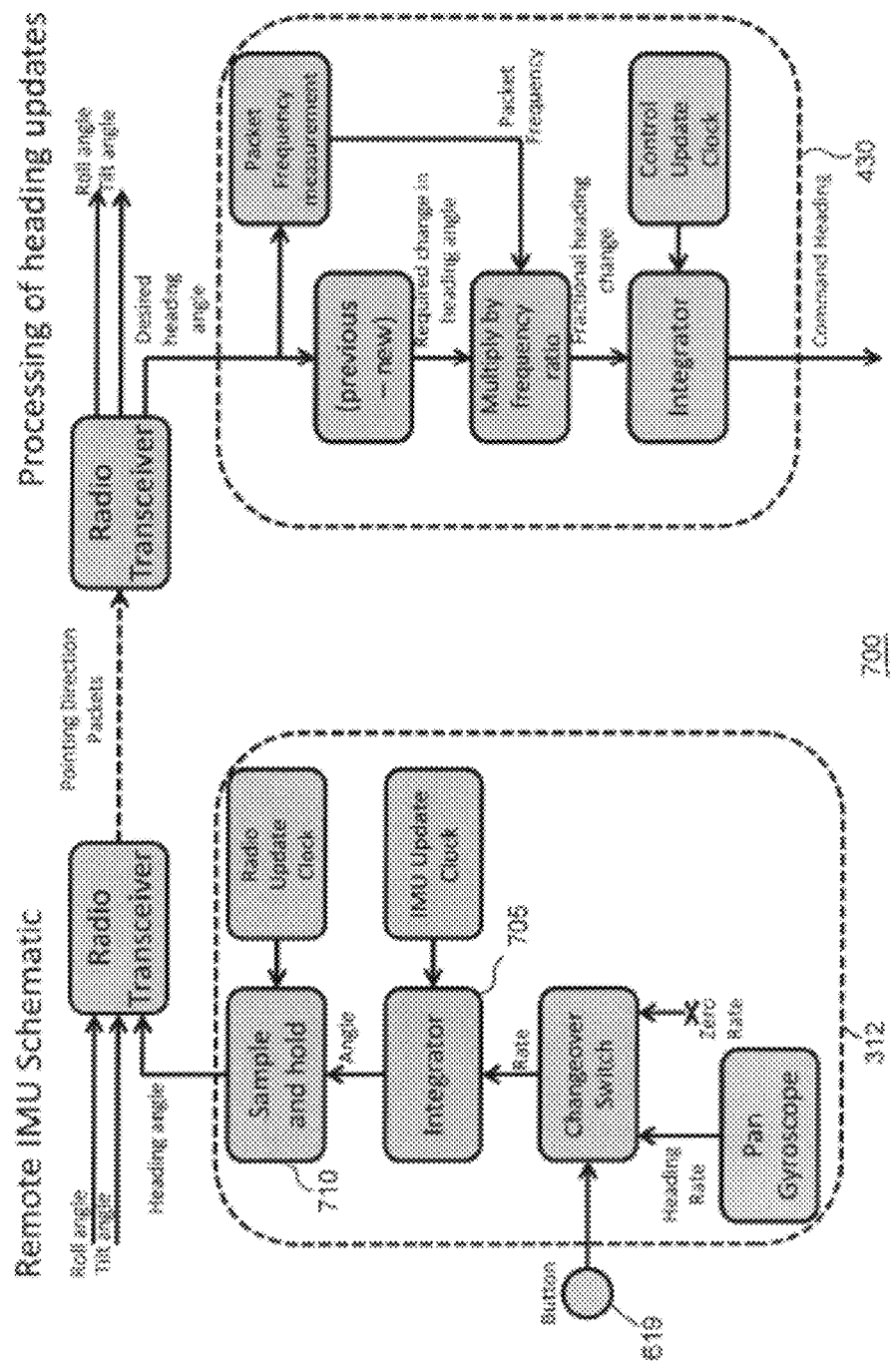
FIG. 7 shows further details of the remote (on the remote control device) and local (on the gimbal) IMUs, in accordance with some embodiments.

FIG. 7 shows further details of the remote (on the remote control device) and local (on the gimbal) IMUs 312 and 430 respectively, in accordance with some embodiments. The depicted processes 700 include packet generation and gimbal packet reception with the fractional pointing update discussed in respect of FIG. 5.

The IMU 312 or 430, remote or local, includes a set of 3 gyroscopes measuring angular rate in pitch, roll, and yaw axes. Nominally, the IMU is orientated such that pitch is described as tilt, roll as roll, and yaw as heading or pan. Addition of an accelerometer and appropriate processing allows aligning of these axes further in relation to the world frame coordinates, using gravity as a reference. To simplify explanation, FIG. 7 depicts only a single axis, i.e., pan. However, similar functionalities and processes are applicable in the context of the roll and tilt axes.

The pan gyroscope outputs a signal that is representative of motion around the pan axis. If there is zero motion, the signal is zero. If there is clockwise or anticlockwise motion, then the signal magnitude and sign will represent that motion. To enable determination of a pan heading angle, the gyroscope signal is integrated using an integrator 705. This may be implemented using analogue electronics. However, it is preferable to rely on the digital signal processing (DSP) techniques.

More specifically, to improve accuracy that is influenced by the jerkiness in motions of the remote operator, the integration period is normally set to a faster timescale than the expected motion. A frequency in the range of 250-500 Hz is preferable; however, frequencies outside of this range on both sides can be employed as well. The applied integration methods include, but are not limited to, simple Simpsons or more complex Newton-Cotes techniques. The output of the integration step is a pseudo heading angle that has a reference which is tied only to the point with which the IMU was powered up, and the particular orientation in which the IMU happened to be at the time.

As discussed in respect of FIG. 6, it is desirable to be able to alter this reference heading using a switch, such as a button. This functionality may be achieved by suspending the integrator 705, for example, by supplying to the integrator a zero value instead of the actual heading rate. Thus, while the switch is engaged or depressed, the reported heading angle will remain fixed at the same value, and thus not further adjustments to the pointing direction of the camera will be effected.

The depicted IMU schematic also contains a sample and hold function 710 that isolates one particular heading calculation at some lower rate than the actual IMU update rate. This heading information may be assembled into a radio packet containing the respective roll and tilt readings, and then transmitted using a radio modem or by other means to the gimbal. The update rate for the radio is typically 50 Hz which is above the rate that a human operator needs to give a fluid command response, but below the data rate limit that would normally apply for typical radio modems. A typical rate for the radio modem that can be employed the described systems is 9600 Baud-115 kBaud, and angle readings are typically be represented by 16 bit words. Therefore, 3 readings at 50 Hz together with a 16-bit address and 16-bit CRC result in 4 kBaud. A CRC check is preferably applied to ensure the packets are not corrupted or commanding extraneous angles. A corrupt packet, if detected, may be simply ignored.

On the receiving end, at the gimbal, the reverse radio modem configuration is employed, e.g., packets are received, CRC checked, and pan, roll and tilt commands are emitted. Referring to pan only, for brevity, the update frequency is measured locally at the gimbal. This allows the local control to correctly calculate the fractional update needed to ensure smooth motion of the camera. It also allows for the packet rate to be adjusted at the transmitter end with automatic compensation for finer control finesse.

To enable the fractional update, a subtraction is performed via a memory stage that compares the previous heading (pan angle) to the new commanded heading (pan angle). The difference is the total angular step required in $\frac{1}{50}$th of a second (for 50 Hz updates). By taking this delta angle and subdividing it by the ratio of the local control frequency and the packet frequency an accurate fractional update is derived.

For the example, where the local control is at 500 Hz the angular step can be divided into 10 smaller steps from the factor 500 Hz/50 Hz. The fractional heading change is then simply integrated to form a local pseudo heading that follows the changes in the commanded heading. This fractional adjustment results in the illusion of smooth motion without large discontinuity. The pseudo heading becomes the local commanded heading for the pre-existing gimbal controller. Again, this commanded heading carries no reference angle and is aligned to zero (or some other value) at power-up. The facility of the button override will provide an offset between the remote and local headings. An absolute reference can also be derived from a compass mounted in both IMUs.

The order of execution or performance of the operations in the embodiments illustrated and described herein is not essential, unless otherwise specified. Further, not all operations are necessarily performed. That is, the operations/steps described herein, may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods and operations described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. As used herein, "computer readable medium" does not consist of a carrier wave or propagating signal. A non-transitory computer-readable storage medium includes, but is not limited to, volatile memory, non-volatile memory, magnetic and optical storage devices such as disk drives, magnetic tape, CDs (compact discs), DVDs (digital versatile discs), flash memory cards, such as a micro-SD memory card, or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

It is to be understood that the present disclosure includes permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

It should be further understood that multiple parameters, settings, and modes discussed herein are adjustable by the camera operator and/or remote operator, at the time the system is initialized and/or while in use, e.g., during filming. Different modes for operating the remote control device may be predefined, for example for different types of scene, and activated the operator as needed.

More specifically, in some embodiments, the remote operator may set up or adjust any of the parameters and settings discussed herein, using a remote controller/remote control device, a computer (or other processing device) running a set-up/adjustment application, or any other device in communication with the stabilization system and/or camera, via a remote link, wireless, such as radio (e.g., cellular, Wi-Fi, Bluetooth) or wired (e.g., fiber optics, cabling, or the like). The set-up/adjustment application provides its user (e.g., remote operator, camera operator, or other) with a graphical interface (GUI) that enables the user to select and adjust desired parameters and/or settings for the stabilization system and/or camera, activate or deactivate different modes supported by the stabilization system, including for selected or all axes (pan, tilt, roll), and/or camera, and the like. Corresponding commands (data, values) are transmitted to the stabilization system and/or camera so as to update the respective parameters and settings there. That is, the user is able to control and adjust various parameters and settings of the camera and/or stabilization system and/or activate/deactivate different modes remotely, using a specially designed application, installed on the device or web-based. The adjustable parameters and settings include, but are not limited to, camera and remoter control device's settings, e.g., focal settings, such as a focal length of the lens; distances, e.g., to the filming subject, height, or the like; various thresholds, scale factors, forcing functions, control loops settings, such as PID gains, maximum and/or minimum values, filters settings and bandwidth, settings for different axes, sensors' settings, storage settings, control rates, calibrations, offsets, and the like. The application may also inform the user about the system/camera/remote control's status(es) and voice alarms when errors are detected.

Further, although it is preferable to control the commanded angle and use a 'pseudo' rate to make small discrete angle steps in the manner described above, a rather similar control can be achieved by commanding changes to angular rate values. In the latter scenario, the motion measurement transmitted from the remote control device is in the form of the commanded angular rate and no pseudo rate is used. For example, a single loop instead of nested loops may be employed.

Finally, while the invention has been described in terms of various specific embodiments, the skilled person would recognize that the invention could be practiced with modification within the spirit and scope of the claims.

The invention claimed is:

1. A method of adjusting a pointing angle of a camera, using a remote control device comprising a steering member and an inertial measurement unit, the camera housed by a stabilization system that comprises a second inertial measurement unit and is configured to stabilize the camera in accordance with a commanded pointing direction, the remote control device being separate from the camera and stabilization system, the method comprising:
   deriving a first measurement indicative of a pointing direction of the steering member in relation to a rotational movement of the steering member about one or more of a pan axis, tilt axis, or roll axis using the inertial measurement unit; and
   transmitting the first measurement to the stabilization system as the commanded pointing direction to effectuate adjustment of the pointing angle of the camera to follow the rotational movement of the steering member,
   wherein the steering member is rotatable around one or more of the pan axis, tilt axis, or roll axis.

2. The method according to claim 1, further comprising:
   deriving a second measurement indicative of the pointing direction of the steering member in relation to the rotational movement; and
   transmitting the second measurement to the stabilization system as the commanded pointing direction, wherein if the second measurement differs from the first measurement, adjustment of the pointing angle of the camera is effectuated to further follow the rotational movement of the steering member.

3. The method according to claim 2, further comprising:
   determining, for the stabilization system, a series of fractional updates to the commanded pointing direction based on the received first measurement; and
   adjusting, by the stabilization system, the pointing angle of the camera in accordance with each of the series of fractional updates of the commanded pointing direction applied sequentially until the second measurement is received, to cause the camera to follow the rotational movement of the steering member.

4. The method of claim 3, wherein the series of fractional updates is determined depended on frequency with which measurements indicative of the pointing direction of the steering member are received by the stabilization system and frequency with which control updates are performed at the stabilization system.

5. The method according to claim 2, further comprising:
   causing the camera to stop following the rotational movement of the steering member about one or more of the pan axis, the tilt axis, or the roll axis while a designated switch of the remote control device is engaged.

6. The method according to claim 5, wherein causing the camera to stop following the rotational movement of the steering member comprises setting to zero an angular rate supplied to an integrator of the remote control device.

7. The method according to claim 1, further comprising:
   receiving a video being captured by the stabilization system; and
   displaying the video on a display device of the remote control device.

8. The method according to claim 7, wherein the video is captured by one or more of the camera or a co-located second camera having correlated fields of view.

9. The method according to claim 1 performed for one of the pan axis, the tilt axis, or the roll axis,
   wherein the commanded pointing angle for the camera for another one of the pan axis, the tilt axis, or the roll axis is determined based on measurements indicative of a pointing direction of the steering member of the stabilization system and derived in relation to a rotational movement of the steering member of the stabilization system about the other axis.

10. The method according to claim 1, wherein the commanded pointing direction is one of a commanded pointing angle or a commanded angular rate.

11. A non-transitory computer-readable medium storing program instructions for causing a processor to perform a method of adjusting a pointing angle of a camera, using a remote control device comprising a steering member and an inertial measurement unit, the camera housed by a stabilization system that comprises a second inertial measurement unit and is configured to stabilize the camera in accordance with a commanded pointing direction, the remote control device being separate from the camera and the stabilization system, the method comprising:
   deriving a first measurement indicative of a pointing direction of the steering member in relation to a rotational movement of the steering member about one or more of a pan axis, tilt axis, or roll axis using the inertial measurement unit; and
   transmitting the first measurement to the stabilization system as the commanded pointing direction to effectuate adjustment of the pointing angle of the camera to follow the rotational movement of the steering member,
   wherein the steering member is rotatable around one or more of the pan axis, tilt axis, or roll axis.

12. The computer-readable medium according to claim 11, wherein method further comprises:
   deriving a second measurement indicative of the pointing direction of the steering member in relation to the rotational movement; and
   transmitting the second measurement to the stabilization system as the commanded pointing direction, wherein if the second measurement differs from the first measurement, adjustment of the pointing angle of the camera is effectuated to further follow the rotational movement of the steering member.

13. The computer-readable medium according to claim 12, wherein the method further comprises performing the deriving and transmitting steps for another one of the pan axis, the tilt axis, or the roll axis to effectuate adjustment of the pointing angle of the camera to follow the rotational movement of the steering member of the stabilization system about the other axis.

14. A remote control device for remotely adjusting a pointing angle of a camera housed by a stabilization system that comprises a second inertial measurement unit and is configured to stabilize the camera in accordance with commanded pointing direction, the remote control device being separate from the camera and the stabilization system, the remote control device comprising:
  a steering member rotatable around one or more of a pan axis, a tilt axis, or a roll axis of the remote control device;
  an inertial measurement unit (IMU) mounted on the steering member and configured to measure a pointing direction of the steering member in relation to one or more of the pan axis, the tilt axis, or the roll axis using the inertial measurement unit;
  a controller configured to derive a pointing direction update based on measurements obtained by the IMU; and
  a transmitter configured to transmit the derived pointing direction update as commanded pointing direction to the stabilization system to effectuate adjustment of a pointing direction of the camera to follow a rotational movement of the steering member.

15. The remote control device according to claim 14, further comprising a switch, engagement of which causes the camera to stop following the rotational movement of the steering member about one or more of the pan axis, the tilt axis, or the roll axis.

16. The remote control device according to claim 15, wherein an angular rate supplied to an integrator of the remote control device is set to zero for duration of the switch being engaged.

17. The remote control device according to claim 16, wherein the steering member remains rotatable around one or more of the pan axis, the tilt axis, or the roll axis of the remote control device when the switch is engaged.

18. The remote control device according to claim 14, further comprising:
  a receiver configured to receive a video signal from the stabilization system; and
  a display device configured to display the received video signal to provide video feedback of pointing control of the camera.

19. The remote control device according to claim 18, wherein the received video is a video being captured by one or more of the camera or a co-located second camera having a correlated field of view with the camera.

* * * * *